United States Patent [19]

Bryan

[11] Patent Number: 5,109,624

[45] Date of Patent: May 5, 1992

[54] AUTOMATIC FISHING DEVICE

[76] Inventor: Byron D. Bryan, Rte. 1 Box 197, Taylor, Ark. 71861

[21] Appl. No.: 670,911

[22] Filed: Mar. 18, 1991

[51] Int. Cl.⁵ ............................................. A01K 97/12
[52] U.S. Cl. ............................................. 43/15; 43/16
[58] Field of Search .................................... 43/15, 16

[56] References Cited

U.S. PATENT DOCUMENTS

| | | | |
|---|---|---|---|
| 76,489 | 4/1868 | McCaughan | 43/15 |
| 1,665,144 | 4/1928 | Murray | 43/15 |
| 2,504,822 | 4/1950 | Fritscher | 43/15 |
| 2,714,270 | 8/1955 | Premo | 43/15 |
| 3,394,484 | 7/1968 | Sonoski | 43/16 |
| 3,798,821 | 3/1974 | Bybee | 43/15 |
| 4,034,498 | 7/1977 | Ikarimoto | 43/15 |
| 4,043,069 | 8/1977 | Zahner | 43/15 |
| 4,204,355 | 5/1980 | Almond | 43/15 |

OTHER PUBLICATIONS

"Mutt & Jeff", McNaught Syndicate, *Washington Star*, Feb. 6, 1972.

*Primary Examiner*—Richard K. Seidel
*Assistant Examiner*—Patty E. Hong
*Attorney, Agent, or Firm*—John M. Harrison

[57] ABSTRACT

An automatic fishing device for suspension from tree limbs, stumps and other supports or objects and automatically hooking fish. In a preferred embodiment the automatic fishing device is characterized by a frame having an inverted T-shape and an arcuate length of tubing mounted in the frame, with both ends of the tubing terminating in spaced relationship in the base support member of the frame. An operating line is slidably disposed in the tubing and a hook is secured to one end of the operating line and a weight to the other end. A slotted trigger is mounted on the tubing support adjacent to the end of the tubing which receives the hook segment of the operating line. When the hook is baited and disposed beneath the surface of the water, the weight is raised above the surface of the water or in the water in spaced relationship with respect to the hook segment of the operating line and the hook segment is inserted in the trigger slot to set the automatic fishing device. The automatic fishing device is operated when a fish strikes the bait and hook, thus disengaging the hook segment of the operating line from the trigger and causing the weight to fall and drive the hook into the mouth of the fish.

13 Claims, 1 Drawing Sheet

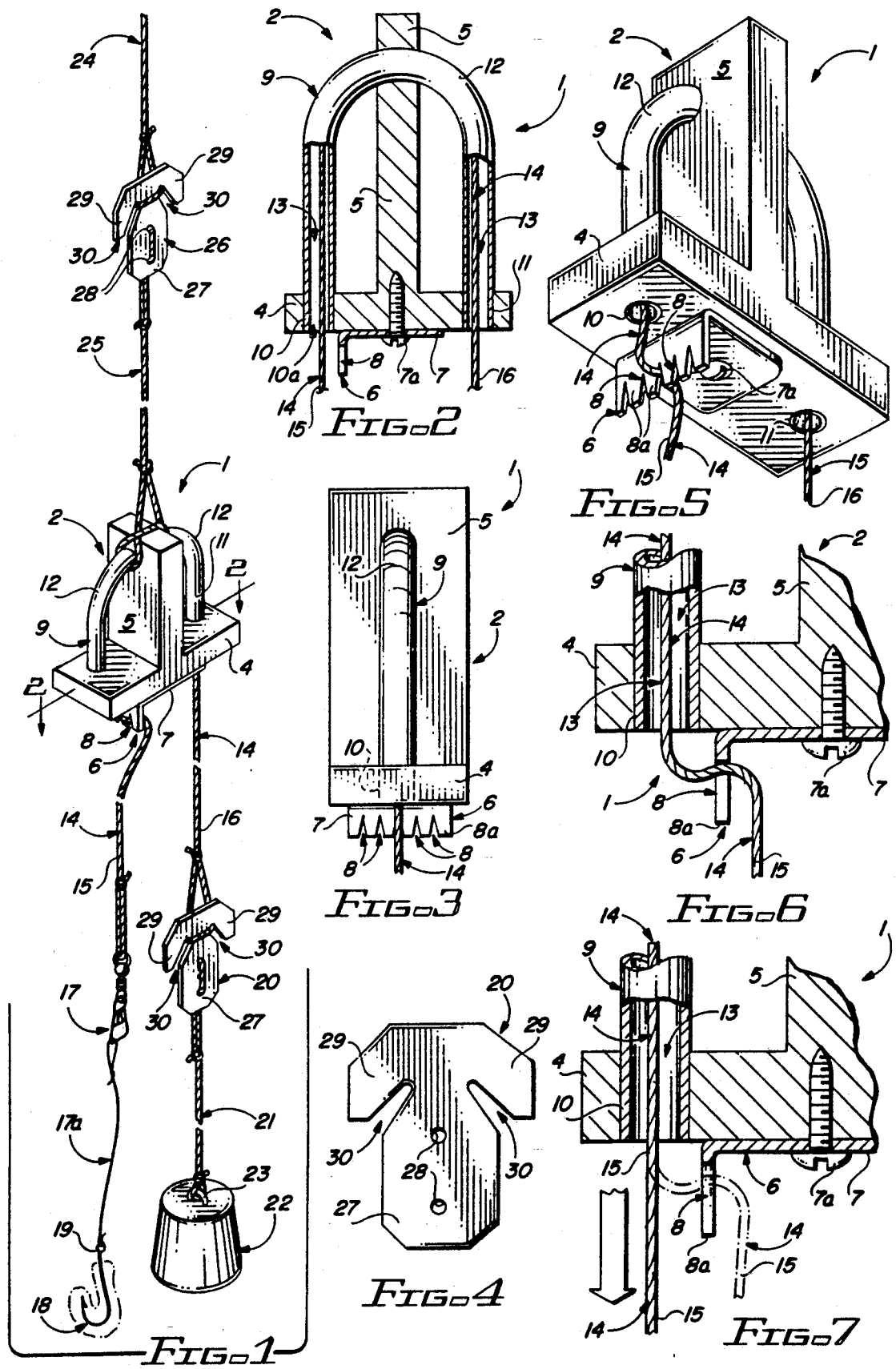

AUTOMATIC FISHING DEVICE

BACKGROUND OF THE INVENTION

1. Field of the Invention

This invention relates to automatic fishing devices commonly called "yo-yo's" and other mechanical devices for suspension over a water body and automatically hooking fish. The automatic fishing device of this invention is characterized by a solid or inverted T-shaped frame and a curved passage or length of tubing disposed in the frame, with both open ends of the passage or tubing facing downwardly in spaced relationship. An operating line is slidably disposed through the path or tubing to define two parallel line segments, one of which is fitted with a hook and the other with a weight. A slotted, serrated or toothed trigger is provided on the frame adjacent the end of the passage or tubing which receives the hook segment of the operating line, to facilitate insertion of the operating line in the trigger when the baited hook is immersed beneath the surface of a water body and the automatic fishing device 1 is suspended above the water body from an overhead object. When a fish strikes the bait and the hook, the hook segment of the operating line is dislodged from the trigger and the weight drops, thereby sliding the operating line in the passage or conduit and forcing the hook into the mouth of the fish. The fish must then struggle against tension in the operating line provided by the weight, until it tires and is held captive until collected.

2. Description of the Prior Art

One of the earliest techniques for catching fish without direct intervention of the fisherman is the placement of a fishing pole or rod on a forked stick and inserting the butt end of the rod or pole in the ground to facilitate automatically hooking and playing a fish. Automatic fishing devices soon became more sophisticated and an early "Fish Trap" device is detailed in U.S. Pat. No. 76,489, dated Apr. 7, 1868, to T. B. McCoughan. The device includes a cantilever mechanism wherein a fishing string is inserted through the mechanism to a trigger which is offset by a pivoted weight. The striking of the hook and bait triggers operation of the pivoted weight and applies pressure on the operating line to strike the fish. A "Fishhook Setting Device" is detailed in U.S. Pat. No. 2,504,822, dated Apr. 18, 1950, to F. Fritscher. The device makes use of the spring tension in a shaped wire member, wherein the ends of the wire member are held in close proximity to each other by a clip when the device is set. An operating string is attached to one end of the wire member and extends downwardly into the water with the hook, which is baited. Striking of the hook causes the tethered end of the spring mechanism to slip from the clip, thus jerking the operating cord and thereby striking the fish. An "Ice Fishing Device" is detailed in U.S. Pat. No. 2,714,270, dated Aug. 2, 19855, to H. J. Premo. The device includes an upward-standing support column, a boom pivotally mounted on the column, with an operating line tied to one end of the boom, a counterweight provided on the other end of the boom for holding the operating line in a desired position and a bracket member mounted on the column and provided with an electric bulb having an exposed central contact. A resilient conductor is mounted on the bracket and has a free end projecting to the region of, but normally spaced with, the bulb contact, an electric cell is mounted on the bracket member and is connected to the member and conductor and an apparatus cooperates with the boom and the conductor free end for effecting contact of the conductor with the central contact to the bulb, upon movement of the boom in opposition to the counterweight. A "Fishing Jigger" is detailed in U.S. Pat. No. 3,394,484, dated July 30, 1968, to K. L. Monski. An oscillatable jigger body is supported at the center thereof and is provided with a fishing line at one end and a pendent fishing line reel at the other end, wherein a running, hooked fish causes line to pay out in a jerking fashion to set the hook in the mouth of the fish. A "Beam Assembly for Fishing" is detailed in U.S. Pat. No. 4,034,498, dated July 12, 1977, to Y. Ikarimoto. The beam assembly includes first and second elastic beams mounted on a weight support and adapted to separate from each other at the free ends. A leader is connected to the outboard end of the first beam and engages an end of the second beam. The first and second beams are maintained in engagement with each other at the free ends thereof and are disengageable from each other when the leader is pulled, for striking a fish. U.S. Pat. No. 4,043,069, dated Aug. 23, 1977, to Marvin L. Zahner, details a "Fish Hook Setting Device". The device includes a wire member configured into a safety pin-type configuration. The triggering mechanism is configured from a second tempered wire having a helical coil lever arm to provide sensitivity adjustment. The second embodiment includes an adjustable line drag mechanism for supporting one end of the fishing line. An "Automatic Fish Catcher" is detailed in U.S. Pat. No. 4,204,355, dated May 27, 1980, to William C. Almond. The fish catcher includes a fishing line attached at one end to a weight, the fishing line extending upwardly from the weight along a horizontal fishing line guide and then downwardly to a fish hook. The weight is slidably movable from its mounting by action of a hooked fish and the size of the weight is such that at least a visible portion of a hooked fish is lifted above the surface of the water as the weight falls. A "Linkage Type Hook Setter Apparatus" is detailed in U.S. Pat. No. 3,798,821, dated Mar. 26, 1974, to Samuel M. Bybee. The apparatus includes a lateral support assembly which is connected to a support surface and an actuator assembly and a vertical support assembly extending therefrom. The actuator assembly, in the form of an elongated member, is pivotally connected at one end of the lateral support assembly and has an L-shaped arm pivotally attached to the other end thereof. The horizontal end portion of the arm has a connector line with a hook secured thereto and a vertical portion is provided with a cam. The elongated vertical support assembly is pivotally connected at one end to the lateral support assembly and extends at an angle relative to the actuator assembly to an outer end, which is engageable with the cam on the actuator arm. A support line is secured to the vertical support assembly through a guide and control member mounted on the end of the vertical support assembly and a spring extends between the actuator and the vertical support assemblies. Movement of the connector line downwardly releases the cam from the vertical support assembly and the spring biases the actuator assembly upwardly, to set the hook in the mouth of a fish.

It is an object of this invention to provide an automatic fishing device which utilizes a counterweight that is counterbalanced by means of an operating line against a hook and a trigger to automatically set the hook in the mouth of a fish when the operating line is disengaged from the trigger.

Another object of the invention is to provide an automatic fishing device which is characterized by a frame fitted with an inverted U-shaped passage or length of tubing, wherein the open ends of the tubing face downwardly for receiving an operating line having a hook at one end and a weight at the other end, with a trigger attached to the trigger frame for receiving the hook end segment of the operating line and suspending the weight over a water body, wherein the weight is dropped and the hook set in a fish when the bait is taken and the operating line is disengaged from the trigger.

Yet another object of this invention is to provide an automatic fishing device which is characterized by one ore more specially designed clip for suspending the automatic fishing device from a fixed object above a water body and the weight element from the frame element of the automatic fishing device.

Still another object of the invention is to provide an automatic fishing device having a frame provided with an inverted "U"-shaped length of tubing for slidably receiving an operating cord having a hook at one end and a weight at the other end and a slotted trigger mounted on the frame for engagement by the operating cord, wherein striking of the hook by a fish disengages the operating cord from the trigger, causing the weight to fall and thereby hooking the fish.

SUMMARY OF THE INVENTION

These and other objects of the invention are provided in an automatic fishing device having a sliding string or cord design, which device includes a frame fitted with a curved passage or length of tubing, the ends of which open downwardly in spaced relationship in the frame and receive an operating line having a hook on one end segment and a counterweight on the opposite end segment and a trigger attached to the frame for receiving the hook end segment and setting the automatic fishing device with a baited hook disposed beneath the surface of the water. Striking of the hook and bait by a fish dislodges the hood end segment of the operating line from the trigger, causing the counterweight to drop, thereby hooking the fish.

BRIEF DESCRIPTION OF THE DRAWING

The invention will be better understood by reference to the accompanying drawing, wherein:

FIG. 1 is a perspective view of a preferred embodiment of the automatic fishing device of this invention in "set" configuration;

FIG. 2 is a sectional view taken along line 2—s of the frame element of the automatic fishing device illustrated in FIG. 1;

FIG. 3 is a side view of the frame element illustrated in FIG. 2;

FIG. 4 is a front view of preferred weight line connector and support line connector accessories of the automatic fishing device illustrated in FIG. 1;

FIG. 5 is a bottom perspective view of the frame element of the automatic fishing device illustrated in FIGS. 1-3;

FIG. 6 is an enlarged section view of a portion of the base support member and tubing elements of the automatic fishing device, with the operating line in "set" configuration, as illustrated in FIG. 1; and FIG. 7 is an enlarged sectional view of a portion of the base support member and tubing elements illustrated in FIG. 6, with the operating line in "strike" configuration.

DESCRIPTION OF THE PREFERRED EMBODIMENTS

Referring initially to FIGS. 1-5 of the drawing, a preferred embodiment of the automatic fishing device of this invention is generally illustrated by reference numeral 1. The automatic fishing device 1 includes a frame 2, shaped in the configuration of an inverted "T", wherein the horizontal element of the "T" is defined by a base support member 4 and the vertical element is defined by an upright support member 5. A curved length of tubing 9 is supported by the upright support member 5 and base support member 4 in an inverted "U" shape, wherein the spaced open ends of the tubing 9 terminate at the bottom surface of the base support member 4, as illustrated in FIG. 5. Accordingly, the tubing 9 is further characterized by an operating end 10 and a weight end 11, which are disposed in spaced relationship in the base support member 4 and face downwardly when the automatic fishing device is oriented in functional "set" configuration, as illustrated in FIG. 1. The curved center section 12 of the tubing 9 extends through and is supported by the upright support member 5, as further illustrated in FIGS. 1-3 and 5. An operating line 14 is inserted in the tubing bore 13 of the tubing 9 and a hook segment 15 of the operating line 14 extends from the operating end 10 of the tubing 9, while a weight segment 16 projects from the weight end 11 of the tubing 9, as further illustrated in FIG. 5. The extending end of the hook segment 15 of the operating line 14 is tied to a swivel 17, to which is attached a length of clear leader 17a. The opposite end of the leader 17a is secured to the hook eye 19 of a hook 18, while the extending end of the weight segment 16 may be tied or otherwise secured to the weight 373 23 of a weight 22. Alternatively, a weight line connector 20, illustrated in FIG. 4, is secured to the weight segment 16 of the operating line 14 and is fitted with a weight line 21, attached to the weight eye 23 of the weight 22, as further illustrated in FIG. 1. Similarly, a support line connector 26, which is identical in design to the weight line connector 20, may be used to suspend the automatic fishing device 1 over a water body from a limb or other fixed object by means of an engaging segment 24 and a support line 25, as further illustrated in FIG. 1. Both the support line connector 26 and the weight line connector 20 are characterized by a connector base 27, which is provided with a pair of vertically spaced base openings 28 and a pair of oppositely-disposed base wings 29, projecting from the upper portion of the connector base 27 and provided with wing slogs 30, spacing the base wings 29 from the connector base 27.

Referring now to FIGS. 3 and 5, a trigger 6 is secured by means of a plate screw 7a to, or is formed integrally with, the base support member 4 of the tubing support 3, adjacent to the operating end of the tubing 9 and the hook segment 15 of the operating line 14. The trigger 6 is further characterized by a trigger plate 7, provided with spaced, V-shaped trigger slots 8, which define teeth 8a and are designed to receive the hook segment 15 of the operating line 14 in removable, line-securing relationship, in order to adjust the depth of the hook 18 in a water body over which the automatic fishing device 1 is suspended, as hereinafter further described.

In operation, referring now to FIGS. 1 and 6 of the drawing, the automatic fishing device 1 is first suspended over a water body containing fish by tying an engaging segment 24 around a limb, stump or other fixed support and inserting a loop in the engaging segment 24 in the wing slots 30 of the support line connector 26. A support line 25 extends from the connector base 27 of the support line connector 26 to the frame 2 of the automatic fishing device 1. The hook segment 15 of the operating line 14 is then extended downwardly and the weight segment upwardly, to facilitate baiting of the hook 18, and the hook 18 and bait are then lowered beneath the surface of the water body to a selected depth, as illustrated in FIG. 1. The hook segment 15 is then inserted in a trigger slot 8 of selected depth in the trigger 6 to suspend the weight 22 above or in the water body, as further illustrated in FIG. 6. In the event that the weight 22 must be removably attached to the weight segment 16 of the operating line 14, then a weight line connector 20, which is already attached to the weight line 21 that secures the weight 22, is removably secured to the weight segment 16, as illustrated in FIG. 1. The automatic fishing device 1 is then set and ready for tripping by striking of a fish.

Referring now to FIGS. 1 and 7, which a fish strikes the bait on the hook 18, pressure is exerted on the hook segment 15 of the operating line 14. If the direction of the strike is away from a vertical plane extending through the support line 25 and the widest dimension of the upright support member 5, the hook segment 15 is immediately released from the trigger slot 8 of the trigger 6 and the weight 22 drops by operation of gravity, thereby forcing the hook into the fish. Alternatively, if the strike is toward a vertical plane extending through the support line 25 and the widest dimension of the upright support member 5, the frame 2 immediately pivots on the support line 25, such that continued pressure on the hook 18 is exerted away from the vertical plane and the hook segment 15 is released from the trigger slot 8 of the trigger 6, as described above. Accordingly, it will be appreciated from a consideration of FIG. 1 that regardless of the direction of striking of the hook 18 by a fish, the frame 2 will pivot in a direction which facilitates quick removal of the hook segment 15 of the operating line 14 from engagement with the trigger slot 8 of the trigger 6, allowing immediate dropping of the weight 22 and hooking of the fish.

It will be further appreciated that the automatic fishing device of this invention may be constructed of a wide variety of materials, including wood, fiberglass, plastic and the like, in non-exclusive particular, according to the knowledge of those skilled in the art. For example, the frame 2 may be constructed of wood and the tubing 9 characterized by a curved length of copper tubing for receiving the operating line 14. The trigger 6 may be constructed of metal and attached to the base support member 4 in close proximity to the operating end 10 for engaging the hook segment 15 of the operating line 14, as described above. Alternatively, it will be recognized that the entire frame 2, including the base support member 4, upright support member 5 and trigger 6 can be molded from an injection-moldable plastic material, further according to the knowledge of those skilled in the art. The tubing 9 may be replaced by a curved passage which is molded into the frame 2. Moreover, the operating line 14 may be nylon or other material having sufficient strength to hold a fighting fish and the size of the automatic fishing device 1 and diameter of the operating line 14 may be chosen commensurate with the size of the fish to be caught. Similarly, the size and weight of the weight 22 may be chosen in accordance with the size and type of fish to be caught.

It will be further appreciated by those skilled in the art that while the weight line connector 20 and support line connector 26 are designed to conveniently secure the weight 22 to the weight segment 16 of the operating line 14 and to the support line 25 and engaging segment 24, respectively, the weight 22 may alternatively be tied directly to the weight segment 16 and the support line 25 tied directly to the supporting object, as described.

Accordingly, while the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. An automatic fishing device comprising frame means adapted for suspension over a water body; a curved passage provided in said frame means; an operating line slidably disposed in said curved passage, wherein a first segment of said operating line and a second segment of said operating line project downwardly from said curved passage and said frame means in spaced relationship; a hook carried by said first segment and a weight carried by said second segment; and a plate carried by said frame means adjacent to said first segment, at least one slot provided in said plate, whereby said hook is suspended at a selected depth in the water body and said weight is suspended over the water body responsive to engagement of said first segment of said operating line with said at least one slot and said hook is set in the mouth of a striking fish responsive to disengagement of said first segment from said at least one slot and dropping of said weight toward the water body.

2. The automatic fishing device of claim 1 wherein said frame means further comprises a one-piece frame.

3. The automatic fishing device of claim 1 wherein said curved passage further comprises a conduit shaped generally in the configuration of an inverted "U" for slidably receiving said operating line.

4. The automatic fishing device of claim 1 wherein:
   (a) said frame means further comprises a one-piece frame; and
   (b) said curved passage further comprises a conduit shaped generally in the configuration of an inverted "U" for slidably receiving said operating line.

5. The automatic fishing device of claim 1 wherein said frame means further comprises at least two frame members assembled to define said curved passage and said plate is provided on one of said frame members.

6. The automatic fishing device of claim 1 wherein:
   (a) said frame means further comprises top and bottom frame members assembled to essentially define an inverted "T"; and
   (b) said curved passage further comprises a conduit shaped generally in the configuration of an inverted "U" and mounted in said frame members for slidably receiving said operating line.

7. An automatic fishing device adapted for suspension from an object over a water body, comprising:
   (a) a frame;

(b) a support line carried by said frame for removable attachment to the object;

(c) a cured passage provided in said frame, said curved passage shaped substantially in the configuration of an inverted "U", with the open ends of said passage terminating at spaced openings in the bottom of said frame;

(d) an operating line slidably disposed in said curved passage, wherein a hook segment of said operating line projects downwardly from one of said openings and a weight segment of said operating line projects downwardly from the other of said openings;

(e) a hook carried by said hook segment of said operating line and a weight carried by said weight segment of said operating line; and (f) a plate carried by said frame adjacent to said one of said openings and a plurality of slots provided in said plate and facing said hook segment of said operating line for removably receiving and securing said hook segment of said operating line responsive to immersing of said hook in said water body, whereby said hook segment is disengaged from a selected one of said slots by a fish striking said hook and the hook is set in the mouth of the fish responsive to tension applied to said operating line as said weight falls toward the water body.

8. The automatic fishing device of claim 7 wherein said frame further comprises a one-piece frame.

9. The automatic fishing device of claim 7 wherein said frame further comprises at least two frame members and said curved passage further comprises a conduit shaped generally in the configuration of an inverted "U" for slidably receiving said operating line.

10. An automatic fishing device for suspension from an object over a water body, comprising:

(a) a frame;

(b) a support line carried by said frame for removable attachment to the object;

(c) a conduit provided in said frame, said conduit shaped substantially in the configuration of an inverted "U" and the open ends of said conduit terminating at spaced conduit openings in the bottom of said frame;

(d) an operating line slidably disposed in said conduit, wherein a hook segment of said operating line projects downwardly from one of said conduit openings and a weight end of said operating line projects downwardly from the other of said conduit openings;

(e) a hook carried by said hook segment of said operating line and a weight carried by said weight segment of said operating line; and (f) a slotted trigger carried by said frame adjacent said one of said openings for releasably engaging said hook segment of said operating line responsive to immersing said hook in said water body to a selected depth, whereby said hook segment is disengaged from said slotted trigger by a fish striking said hook and the hook is set in the mouth of the fish as said operating slides in said conduit and said weight falls toward the water body.

11. The automatic fishing device of claim 10 further comprising a support line connector attached to said support line and an engaging line removably attached to said support line connector for removably engaging the object and suspending said automatic fishing device over the water body.

12. The automatic fishing device of claim 10 further comprising a weight line connector adapted for removably engaging said hook segment of said operating line and a weight line attached to said weight line connector to engaging said weight and suspending said weight over the water body.

13. The automatic fishing device of claim 10 further comprising:

(a) a support line connector attached to said support line and an engaging line removable attached to said support line connector for removably engaging the object and suspending said automatic fishing device over the water body; and (b) a weight line connector adapted for removably engaging said hook segment of said operating line and a weight line attached to said weight line connector for engaging said weight and suspending said weight over the water body.

* * * * *